UNITED STATES PATENT OFFICE 2,162,323

PROCESS FOR THE RECOVERY OF BERYLLIUM COMPOUNDS

Albert Wille, Frankfort-on-the-Main, and Gustav Jaeger, Neu-Isenburg, Germany, assignors to Deutsche Gold- und Silber-Scheideanstalt vormals Roessler, Frankfort-on-the-Main, Germany, a corporation of Germany No Drawing. Application June 15, 1936, Serial No. 85,430. In Germany June 20, 1935

7 Claims.  (Cl. 23—16)

This invention relates to the recovery of beryllium compounds from beryllium-containing minerals, particularly beryl, by decomposing the same with fluorides, particularly ammonium fluoride.

According to a known process beryl is decomposed by heating with about three times the theoretically necessary quantity of ammonium fluoride. In this process the silica is volatilised as $SiF_4$ and the beryllium fluoride remains behind together with the fluorides of the other metals.

According to another known process, disclosed in Patent No. 1,975,482, beryl ground to dust fineness is decomposed by the action of ammonium fluoride vapours at temperatures between 350 and 600° C. in accordance with the following equation:

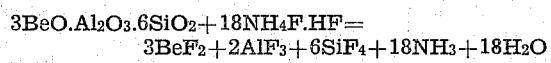

A 10–20% excess of fluoride over the theoretical quantity is said to be sufficient for carrying out this process.

According to the present invention the decomposition of beryllium-containing minerals is effected with ammonium fluoride, preferably ammonium bifluoride, the quantity of the ammonium fluoride employed being maintained lower than the quantity, which would be necessary to convert the beryllium-containing mineral into ammonium-beryllium fluoride. About half or slightly more of the theoretically necessary quantity of ammonium fluoride may for example be employed, so that accordingly about 24 to 25 kgms. of ammonium bifluoride are sufficient for the decomposition of for example 100 kgms. of beryl.

The process of the present invention offers the advantage over the known processes, in which ammonium fluoride is used as decomposing agent, that considerably lower quantities of ammonium fluoride are required and the process can be extraordinarily simply carried out. It is for example unnecessary first to convert the ammonium fluoride into vapour and to cause the vapour to react with the beryl material ground to dust fineness.

It has also been proposed, as disclosed in British Patent No. 423,543, to decompose beryllium-containing minerals with alkali bifluorides in accordance with the following equation:

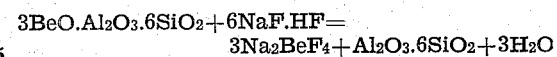

In this case the quantity of the acid sodium fluoride can be so far reduced that the fluorine corresponds exactly to the beryllium content of the mineral; the whole of the beryllium has accordingly to be converted into water-soluble sodium-beryllium fluoride.

The process of the present invention differs from the foregoing process in that less ammonium fluoride is employed than would be necessary to convert the beryl into ammonium-beryllium fluoride. As mentioned above, about half of the quantity of ammonium bifluoride required for this purpose suffices. The further advantage is obtained that the extraction of the decomposed material proceeds substantially more easily and a part of the fluoride employed can be recovered by simple sublimation.

The process of this invention may be carried into effect by heating a mixture of finely ground beryl with the quantity of ammonium fluoride to be employed according to the invention to suitable decomposition temperatures, for example 250° to 600° C. The beryllium is preferably recovered in the form of beryllium oxyfluoride, if desired in the form of mixtures of beryllium oxyfluoride with other beryllium compounds for example beryllium fluoride. The beryllium compounds which are readily soluble in water can be removed from the reaction product in the usual manner for instance by leaching with water. The aqueous liquid may be worked up by the usual methods, for example by evaporation or by precipitating the beryllium for instance in the form of its hydrate. The process may be carried out with neutral or acid ammonium fluoride. The use of the cheaper ammonium bifluoride is recommended. The process is preferably carried out under pressure. When working on a large scale steps may be taken to effect thorough mixing of the material. The decomposition may for example be carried out in a rotating tube in which the material is continuously turned over.

The following example serves to illustrate how the process of this invention may be carried into effect:

650 gms. of beryl (containing 11% of BeO) are thoroughly mixed with 150 to 180 gms. of ammonium bifluoride and the mixture is heated in a bomb tube for 1½ hours to 400 to 450° C. After the decomposition is completed, the reaction product is boiled with water slightly acidified with hydrochloric acid and the beryllium is precipitated as hydroxide by means of soda lye and the hydroxide is dried and calcined. The yield amounts to at least 73%.

Having now particularly described and ascertained the nature of our said invention and in what manner the same is to be performed, we declare that what we claim is:

1. A process for recovery of beryllium compounds from beryllium-containing minerals which comprises mixing the said material in a finely ground state with a quantity of ammonium fluoride which is substantially less than the theoretical quantity necessary to convert the beryllium present into ammonium beryllium fluoride, heating the mixture in a closed vessel to decompose the material and to produce a substantial quantity of beryllium oxyfluoride, leaching the reaction product after the decomposition is completed with water and recovering the beryllium from its solution thus obtained.

2. A process for recovery of beryllium compounds from beryl containing minerals which comprises mixing the said beryl mineral in a finely ground state with a quantity of ammonium fluoride which is substantially less than the theoretical quantity necessary to convert the beryllium present into ammonium beryllium fluoride, heating the mixture in a closed vessel to decompose the material and to produce a substantial quantity of beryllium oxyfluoride, leaching the reaction product after the decomposition is completed with water and recovering the beryllium from its solution thus obtained.

3. A process for recovery of beryllium compounds from beryllium-containing minerals which comprises mixing the beryllium-containing material in a finely ground state with a quantity of ammonium fluoride which is substantially less than the theoretical quantity necessary to convert the beryllium present into ammonium beryllium fluoride, heating the mixture in a closed vessel under pressure to decompose the material and to produce a substantial quantity of beryllium oxyfluoride, leaching the reaction product after the decomposition is completed with water and recovering the beryllium from its solution thus obtained.

4. A process for recovery of beryllium compounds from beryllium-containing minerals which comprises mixing the said material in a finely ground state with a quantity of ammonium fluoride which is substantially less than the theoretical quantity necessary to convert the beryllium present into ammonium beryllium fluoride, heating the mixture in an autoclave to decompose the material and to produce a substantial quantity of beryllium oxyfluoride, leaching the reaction product after the decomposition is completed with water and recovering the beryllium from its solution thus obtained.

5. A process for recovery of beryllium compounds from beryllium-containing minerals which comprises mixing the beryllium-containing material in a finely ground state with a quantity of ammonium fluoride which is about one half of the theoretical quantity necessary to convert the beryllium present into ammonium beryllium fluoride, heating the mixture in a closed vessel to decompose the material and to produce a substantial quantity of beryllium oxyfluoride, leaching the reaction product after the decomposition is completed with water and recovering the beryllium from its solution thus obtained.

6. A process for recovery of beryllium compounds from beryllium-containing minerals which comprises mixing the beryllium-containing materials in a finely ground state with a quantity of ammonium fluoride which is substantially less than the theoretical quantity necessary to convert the beryllium present into ammonium beryllium fluoride, heating the mixture in a closed vessel to temperatures ranging from 250 to 600° C. to decompose the material and to produce a substantial quantity of beryllium oxyfluoride, leaching the reaction product after the decomposition is completed with water and recovering the beryllium from its solution thus obtained.

7. A process for recovery of beryllium compounds from beryllium-containing minerals which comprises mixing the said material in a finely ground state with a quantity of ammonium fluoride which is substantially less than the theoretical quantity necessary to convert the beryllium present into ammonium beryllium fluoride, heating the mixture in a closed vessel to temperatures ranging from 400 to 450° C. to decompose the material and to produce a substantial quantity of beryllium oxyfluoride, leaching the reaction product after the reaction is completed with water and recovering the beryllium from its solution thus obtained.

ALBERT WILLE.
GUSTAV JAEGER.